US 9,531,100 B2

(12) United States Patent
Fukushima et al.

(10) Patent No.: US 9,531,100 B2
(45) Date of Patent: Dec. 27, 2016

(54) CONNECTOR

(71) Applicant: YAZAKI CORPORATION, Minato-ku, Tokyo (JP)

(72) Inventors: Hirotaka Fukushima, Kakegawa (JP); Daisuke Sugiyama, Kakegawa (JP); Tsutomu Sawada, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/698,256

(22) Filed: Apr. 28, 2015

(65) Prior Publication Data

US 2015/0229055 A1  Aug. 13, 2015

Related U.S. Application Data

(63) Continuation of application No. PCT/JP2013/080220, filed on Nov. 8, 2013.

(30) Foreign Application Priority Data

Nov. 13, 2012  (JP) .................................. 2012-249023

(51) Int. Cl.
| H01R 13/40 | (2006.01) |
| H01R 13/08 | (2006.01) |
| H01R 13/631 | (2006.01) |
| B60L 11/18 | (2006.01) |
| H01R 13/506 | (2006.01) |

(52) U.S. Cl.
CPC ........... *H01R 13/08* (2013.01); *B60L 11/1818* (2013.01); *H01R 13/6315* (2013.01); *H01R 13/506* (2013.01); *H01R 2201/26* (2013.01)

(58) Field of Classification Search
CPC ... H01R 13/41; H01R 13/405; H01R 23/7073; H01R 12/585
USPC .............................. 439/733.1, 692, 931, 247
See application file for complete search history.

(56) References Cited

U.S. PATENT DOCUMENTS

| 4,894,495 A | 1/1990 | Toda |
| 4,968,263 A | 11/1990 | Silbernagel et al. |
| 5,558,533 A | 9/1996 | Hashizawa et al. |
| 5,573,417 A | 11/1996 | Hashizawa et al. |
| 5,593,320 A | 1/1997 | Konda et al. |
| 5,674,086 A | 10/1997 | Hashizawa et al. |

(Continued)

FOREIGN PATENT DOCUMENTS

| BE | 486217 A | 12/1948 |
| CN | 102362412 A | 2/2012 |

(Continued)

OTHER PUBLICATIONS

Communication dated May 10, 2016, from the European Patent Office in counterpart European application No. 13854659.3.

(Continued)

*Primary Examiner* — Hien Vu
(74) *Attorney, Agent, or Firm* — Sughrue Mion, PLLC

(57) ABSTRACT

A connector includes: a terminal to be connected to a mating terminal by a relative movement between the terminal and the mating terminal; a connector housing supporting the terminal; and a terminal displacement portion displaceably supporting the terminal in a direction orthogonal to a direction of the relative movement between the terminal and the mating terminal.

5 Claims, 16 Drawing Sheets

(56) References Cited

U.S. PATENT DOCUMENTS

| | | | |
|---|---|---|---|
| 5,951,314 A | 9/1999 | Durand-Cochet et al. | |
| 6,186,810 B1 | 2/2001 | Barnabe et al. | |
| 7,040,915 B1 * | 5/2006 | Pollack | H01R 4/184 439/424 |
| 8,408,927 B2 * | 4/2013 | Tashiro | H01R 4/70 439/247 |
| 8,430,696 B2 * | 4/2013 | Matsumoto | H01R 13/426 439/271 |
| 9,105,998 B2 * | 8/2015 | Uno | H01R 13/405 |
| 2004/0166744 A1 | 8/2004 | Inaba et al. | |
| 2011/0316373 A1 | 12/2011 | Kobayashi et al. | |
| 2012/0040553 A1 | 2/2012 | Tashiro | |

FOREIGN PATENT DOCUMENTS

| | | | |
|---|---|---|---|
| EP | 0625810 | A2 | 11/1994 |
| EP | 0945937 | A2 | 9/1999 |
| JP | 56154783 | U | 4/1981 |
| JP | 56154783 | A | 11/1981 |
| JP | 59-143285 | A | 8/1984 |
| JP | 10-228939 | A | 8/1998 |
| JP | 10-275653 | A | 10/1998 |
| JP | 11-265740 | A | 9/1999 |
| JP | 2000-082518 | A | 3/2000 |
| JP | 2002-025697 | A | 1/2002 |
| JP | 2004-253163 | A | 9/2004 |
| JP | 2013-232371 | A | 11/2013 |
| WO | 2011/016272 | A1 | 2/2011 |
| WO | 2011/055806 | A1 | 5/2011 |

OTHER PUBLICATIONS

International Search Report for PCT/JP2013/080220 dated Jan. 14, 2014 [PCT/ISA/210].

Written Opinion for PCT/JP2013/080220 dated Jan. 14, 2014 [PCT/ISA/237].

Communication dated Jun. 28, 2016, from the Japanese Patent Office in counterpart application No. 2012-249023.

* cited by examiner

CONNECTOR

CROSS REFERENCE TO RELATED APPLICATION

This application is a Continuation of PCT Application No. PCT/JP2013/080220, filed on Nov. 8, 2013, and claims the priority of Japanese Patent Application No. 2012-249023, filed on Nov. 13, 2012, the content of both of which is incorporated herein by reference.

BACKGROUND

1. Technical Field

The present invention relates to a connector used for a vehicle such as an electric vehicle or a hybrid electric vehicle, and in particular, to an inlet connector used for a charging inlet device.

2. Related Art

Japanese Unexamined Patent Application Publication No. 10-275653 proposes a charging inlet device to which a charging connector as a mating connector is fitted and which is provided to a vehicle in order to charge a battery to be mounted to a vehicle body such as an electric vehicle (EV) or a hybrid electric vehicle (HEV). A description will be given of such a charging inlet device with reference to FIGS. 1 and 2.

As illustrated in FIG. 1, a charging inlet device 500 includes an inlet connector 510 and a cap 520 rotatably provided to the inlet connector 510.

The inlet connector 510 includes a connector housing 511 provided with a plurality of terminals 530 (see FIG. 2) therein, an outer hood 512 covering a periphery of the connector housing 511, and a vehicle body mounting flange portion 513 projecting outwardly from the outer hood 512.

As illustrated in FIG. 2, each terminal 530 is accommodated in a terminal accommodating chamber 511A formed in the connector housing 511, and is connected to a mating terminal (not illustrated) by relative movement therebetween. When each terminal 530 is completely accommodated in the terminal accommodating chamber 511A, each terminal is locked to each lance 511B. Each terminal 530 is accommodated in the terminal accommodating chamber 511A in a state of being positioned according to the locking force of each lance 511B. At this time, respective terminals 530 are arranged along an insertion direction ID of the charging connector with respect to the charging inlet device 500.

SUMMARY

Meanwhile, it is not limited that the insertion direction ID of the charging connector necessarily matches a longitudinal direction of the terminal 530 when the charging connector is inserted into the charging inlet device 500. In other words, if the charging connector is inserted being inclined with respect to the connector housing 511, an axial core of the terminal 530 is inclined in accordance with the inclination of the mating terminal.

Therefore, the insertion force of the changing connector into the charging inlet device 500 increases, a problem (for example, decrease in durability of the terminal 530 or decrease in reliability of connection between the terminal 530 and the mating terminal) occurs due to the increased insertion force.

It is an object of the present invention to provide a connector capable of eliminating such a problem caused by the insertion force by reducing the insertion force of the mating connector even when the mating connector is inserted being inclined with respect to the connector housing.

A connector in accordance with some embodiments includes: a terminal to be connected to a mating terminal by a relative movement between the terminal and the mating terminal; a connector housing supporting the terminal; and a terminal displacement portion displaceably supporting the terminal in a direction orthogonal to a direction of the relative movement between the terminal and the mating terminal.

The terminal displacement portion may include: a first plate portion positioned at a supporting point side of the connector housing; a second plate portion positioned at a mating terminal contact portion side of the terminal; and a twisted portion positioned between the first plate portion and the second plate portion and arranging the first plate portion and the second plate portion to be orthogonal to each other.

The terminal displacement portion may include: an elastic support member supporting the terminal against the connector housing; and a flexible conductive member connected to an opposite side of a mating terminal contact portion of the terminal.

The terminal displacement portion may include: an elastic support member supporting the terminal against the connector housing; and a leaf spring contact portion provided to an opposite side of a mating terminal contact portion of the terminal.

According to the configuration described above, the terminal may be freely displaced by a terminal displacement portion. Therefore, even when the mating connector is inserted being inclined with respect to the connector housing, an axial core of the terminal is displaced in accordance with the inclination of the mating terminal (that is, a so-called core alignment). In this manner, the insertion force of the charging connector decreases so that it is possible to prevent the problem caused by such an insertion force.

DETAILED DESCRIPTION

Figure 1:
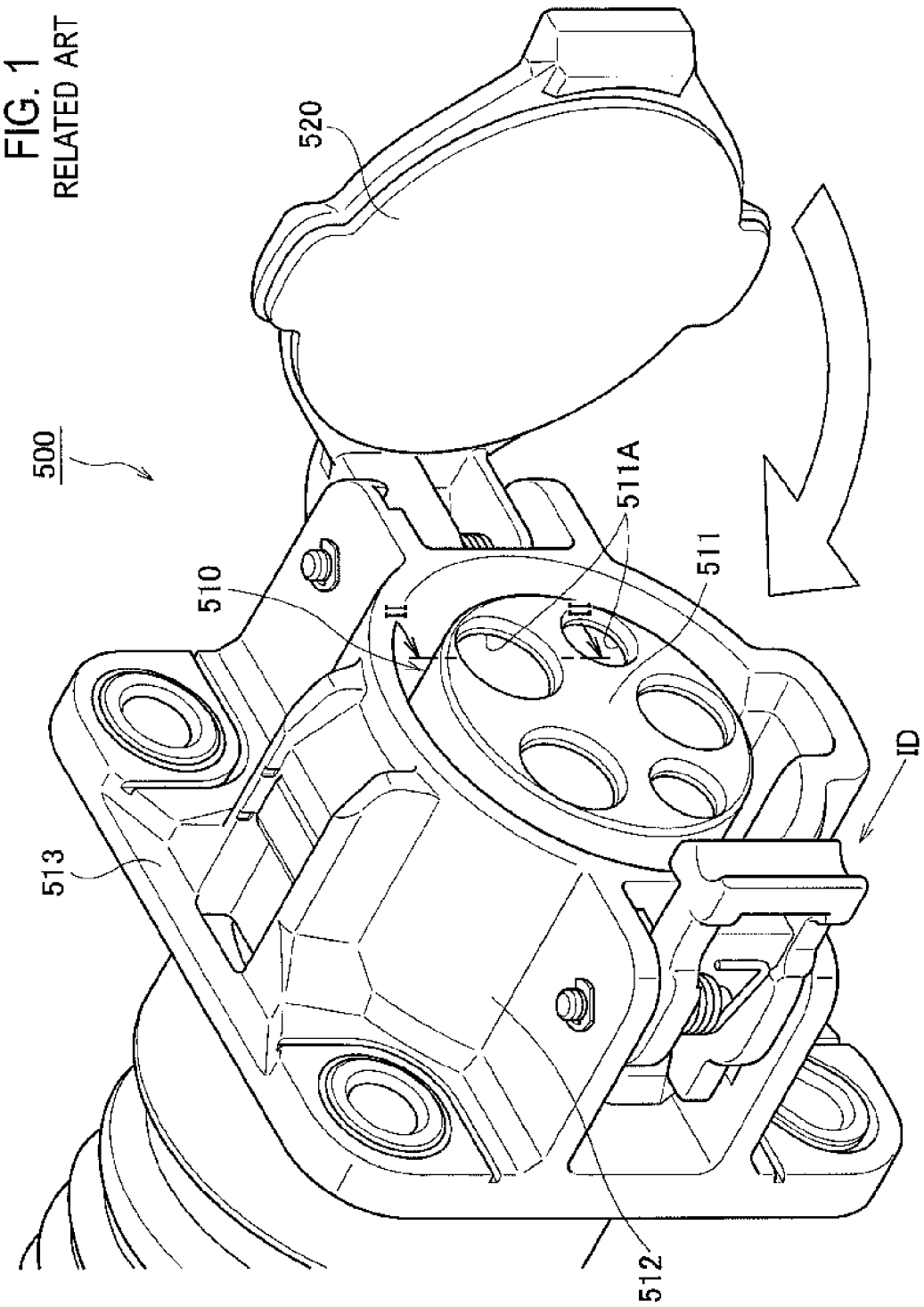
FIG. 1 is a perspective view that illustrates a charging inlet device according to the related art.
Figure 2:
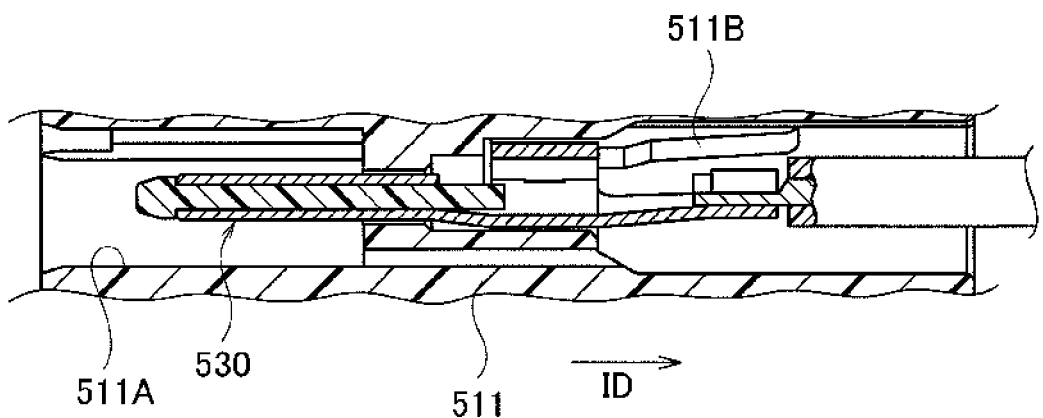
FIG. 2 is a vertical cross-sectional view (cross-sectional view taken along II-II of FIG. 1) of the charging inlet device according to the related art.

A description will be given of a charging inlet device provided with an inlet connector as a connector according to the present invention with reference to the drawings. Incidentally, the same or similar parts are denoted by the same or similar reference signs in the description of the drawing hereinafter. However, it should be noted that the figures are only schematically illustrated, and ratios of dimensions and the like thereof are different from actual ones. Accordingly, specific dimensions and the like should be determined by reference to the following description. Further, the portions in which dimensional relationships and ratios are different from each other may be included among the drawings.

First Embodiment

Configuration of Charging Inlet Device

A description will be given of a configuration of a charging inlet device 1 according to a first embodiment with reference to the drawings. FIGS. 3 to 5B are diagrams that illustrate the charging inlet device 1 according to the first embodiment.

As illustrated in FIGS. 3 to 5B, the charging inlet device 1 is configured so as to be fitted into a charging connector (not illustrated) provided with a mating terminal (not illustrated). The charging inlet device 1 is provided with an inlet connector 100 and a rear connector 200 attached to the inlet connector 100.

The inlet connector 100 includes a connector housing 110 provided with a plurality of terminals 10 therein, an outer hood 120 covering a periphery of the connector housing 110, and a vehicle body mounting flange 130 projecting outwardly from the outer hood 120.

The connector housing 110 is configured by a front housing 110A arranged inside the outer hood 120 and an inner housing 110B attached to the front housing 110A at the rear connector 200 side via a packing 90.

The front housing 110A is formed integrally with the outer hood 120 and the vehicle body mounting flange 130. A plurality of terminal accommodating chambers 111 is formed in the front housing 110A so as to accommodate the plurality of terminals 10. A connector projection 112 (see FIGS. 3 to 5B) with which the rear connector 200 is engaged is provided in an outer circumference at the rear connector 200 side of the front housing 110A.

Figure 4:
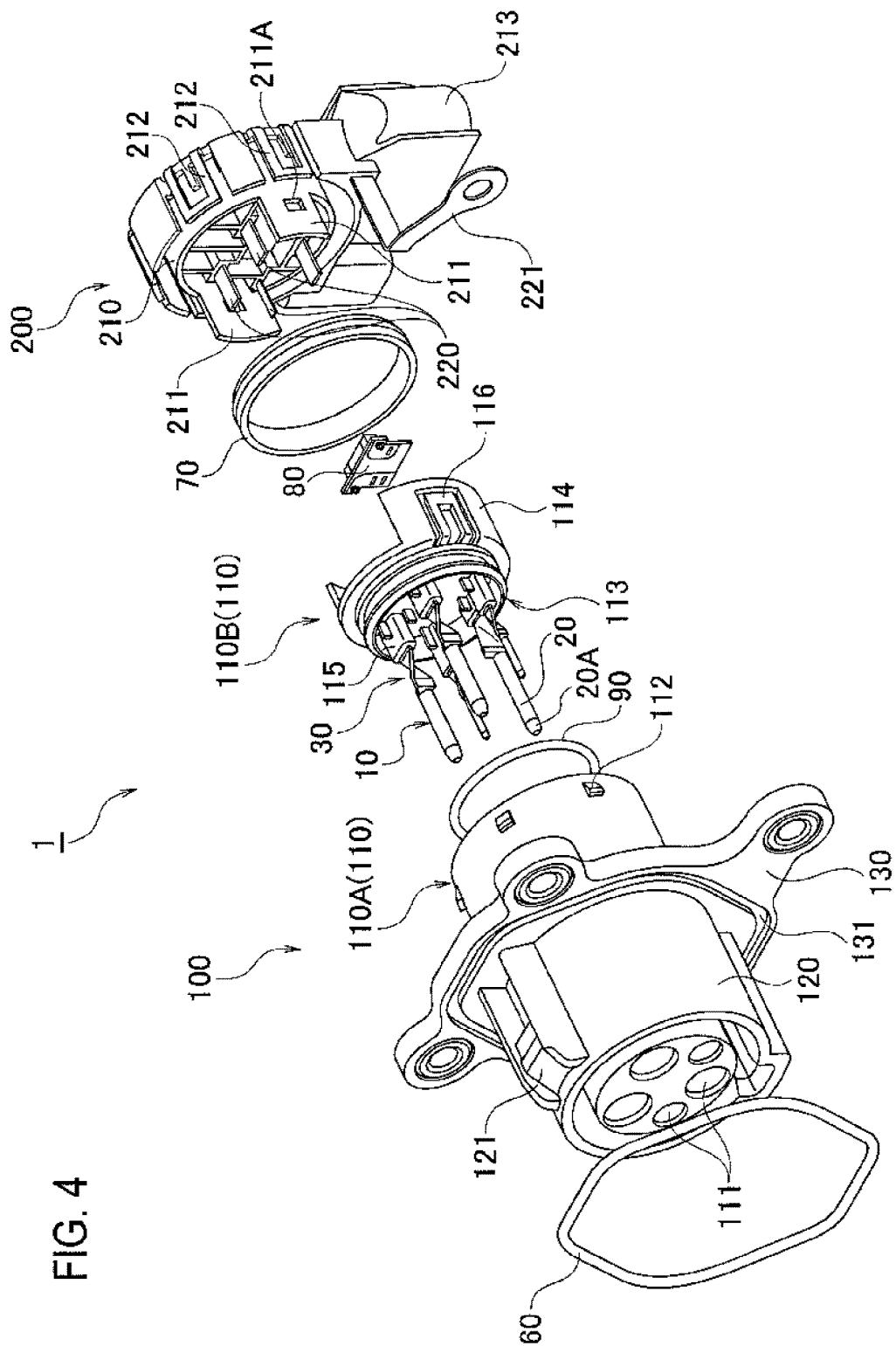
FIG. 4 is an exploded perspective view that illustrates the charging inlet device according to the first embodiment.
Figure 5A:
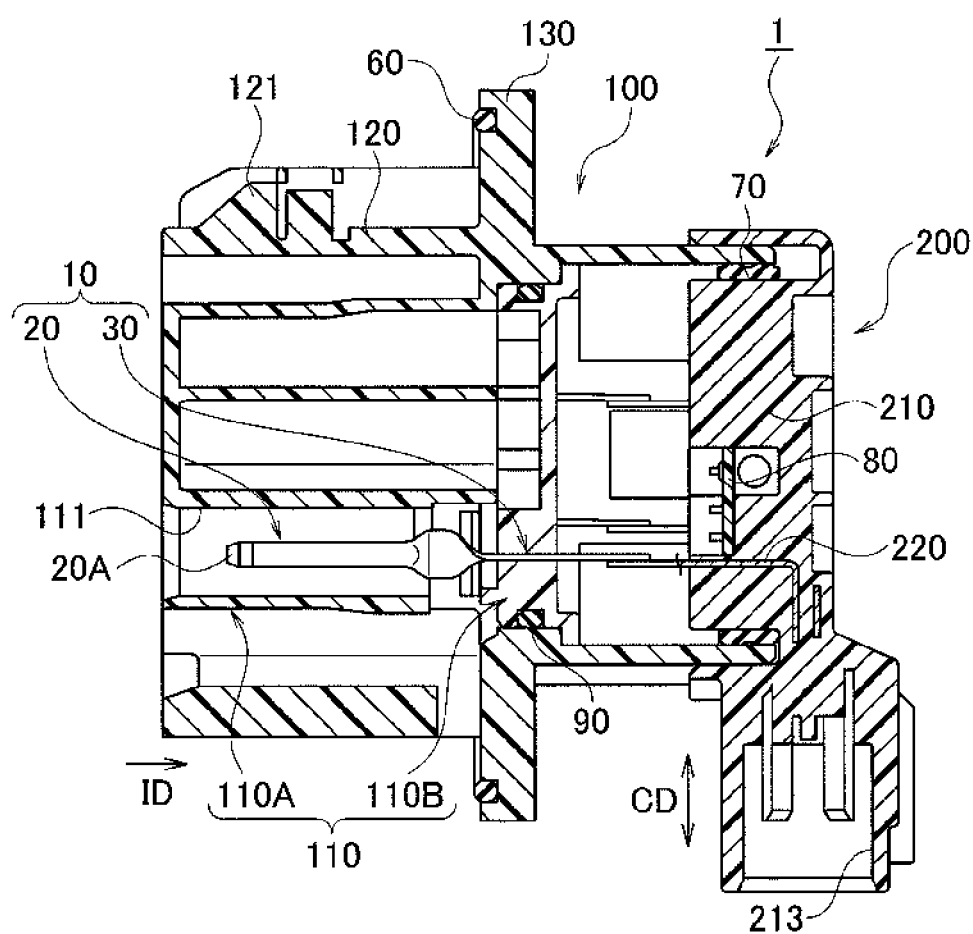
FIG. 5A is a cross-sectional view taken along VA-VA of FIG. 3.
Figure 5B:
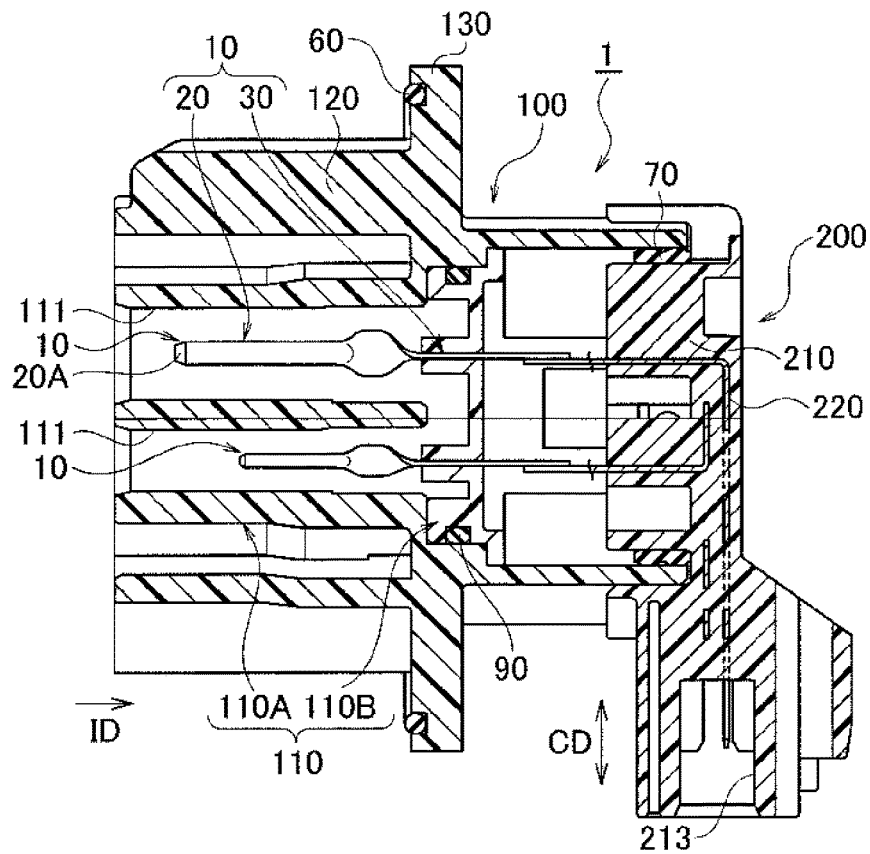
FIG. 5B is a cross-sectional view taken along VB-VB of FIG. 3.

The inner housing 110B is interposed between the front housing 110A and the rear connector 200. As illustrated in FIG. 4, the inner housing 110B includes an inner body portion 113 and an inner overhanging portion 114 overhanging from the inner body portion 113 to the rear connector 200 side.

A plurality of terminal support portions 115, which is arranged to an insertion side of the charging connector (not illustrated) and supports the plurality of terminals 10, is provided in the inner body portion 113. Each terminal 10 supported by the terminal support portion 115 is configured by a charging terminal, a signaling terminal, a grounding terminal and the like. A configuration of each terminal 10 will be described later. An elastic arm 116 is provided in the inner overhanging portion 114 in which a claw portion (not illustrated) projecting inwardly is formed at a distal end thereof.

A lock portion 121 is provided in the outer hood 120 so as to maintain the engagement with the mating terminal (not illustrated). The vehicle body mounting flange 130 can abut on a vehicle body panel p (see FIG. 7), and a packing groove 131 to which a packing 60 is inserted is formed in the front surface of the vehicle body mounting flange 130.

The rear connector 200 is attached with the inner housing 110B to which the terminals 10 are fixed and mounted to the front housing 110A of the inlet connector 100. The rear connector 200 is provided with a rear body portion 210 and an electric wire pull-out terminal 220 arranged in the rear body portion 210.

Figure 3:
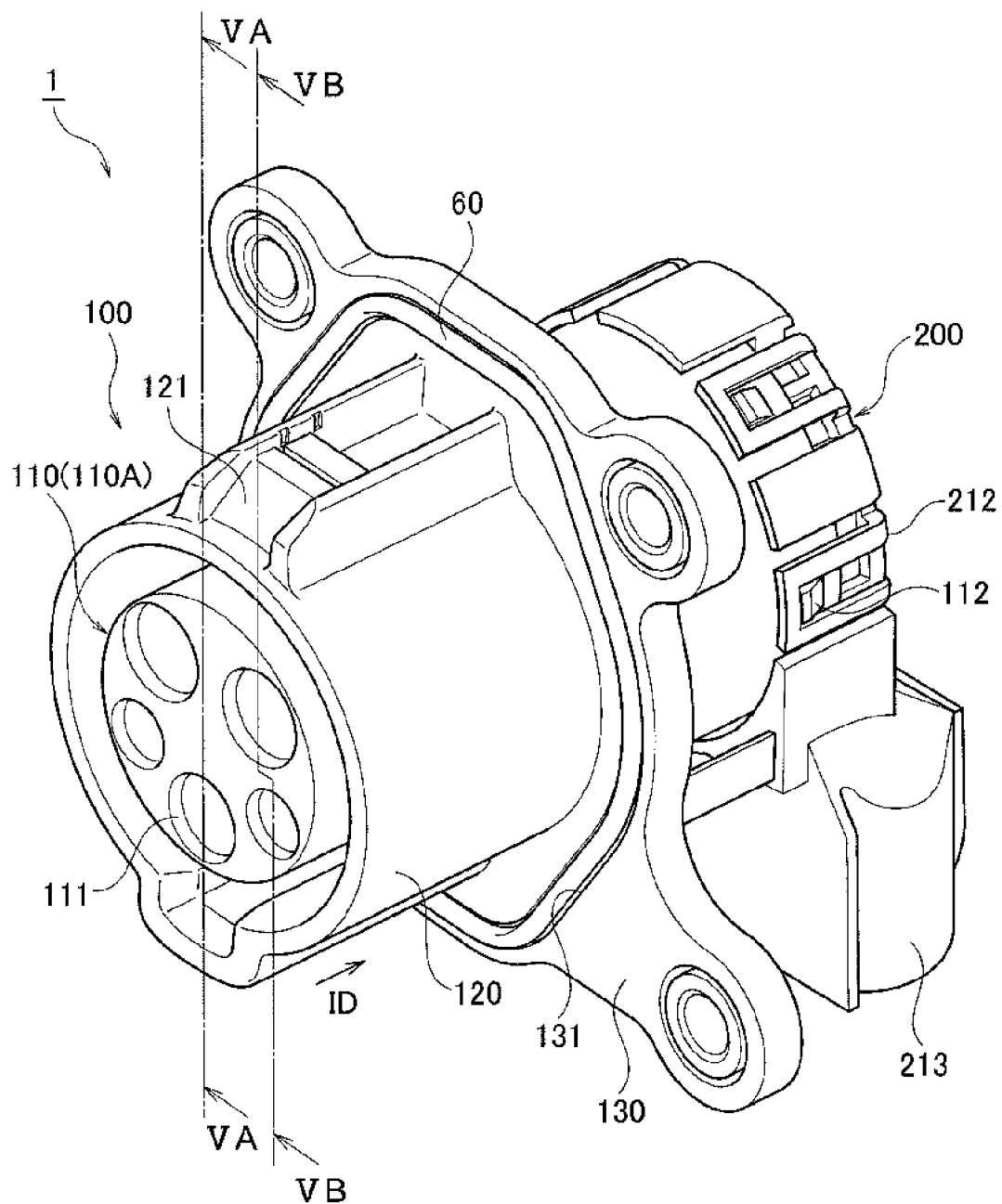
FIG. 3 is an assembled perspective view that illustrates a charging inlet device according to a first embodiment seen from the front.

The rear body portion 210 is provided with a rear overhanging portion 211 in which an engagement hole 211A is formed to be engaged with the claw portion (not illustrated) of the elastic arm 116 arranged in the inner housing 110B, and an engagement arm 212 to be engaged with the connector projection 112 arranged in the front housing 110A at an outer side of the rear body portion 210 (see FIGS. 3 and 4). Further, the rear body portion 210 is further provided with a connector insertion portion 213 arranged along a cross direction CD (downward in the first embodiment) of the insertion direction ID (that is, a movement direction of the mating terminal) of the charging connector.

The electric wire pull-out terminal 220 is insert-molded into the rear connector 200 and is bent in an L shape from the insertion direction ID of the charging connector toward the cross direction CD. In other words, one end of the electric wire pull-out terminal 220 projects from the rear connector 200 to the inner housing 110B side and is connected to the terminal 10. Meanwhile, the other end of the electric wire pull-out terminal 220 projects inside the connector insertion portion 213 of the rear connector 200 and is connected to a terminal (not illustrated) inside a connector C (see FIG. 7) fixed to a terminal end of an electric wire W.

One of a plurality of the electric wire pull-out terminals 220 is connected to the earth terminal among the plurality of terminals 10 and is formed as an earth portion 221 projecting from the rear body portion 210 to the inlet connector 100 side without being led into the connector insertion portion 213. The earth portion 221 is conductively connected to the vehicle body panel P when the charging inlet device 1 is assembled to the vehicle body panel p (see FIG. 7) so that the vehicle body mounting flange 130 and the vehicle body panel P are fastened to each other by a bolt or the like.

Configuration of Terminal

Figure 6:
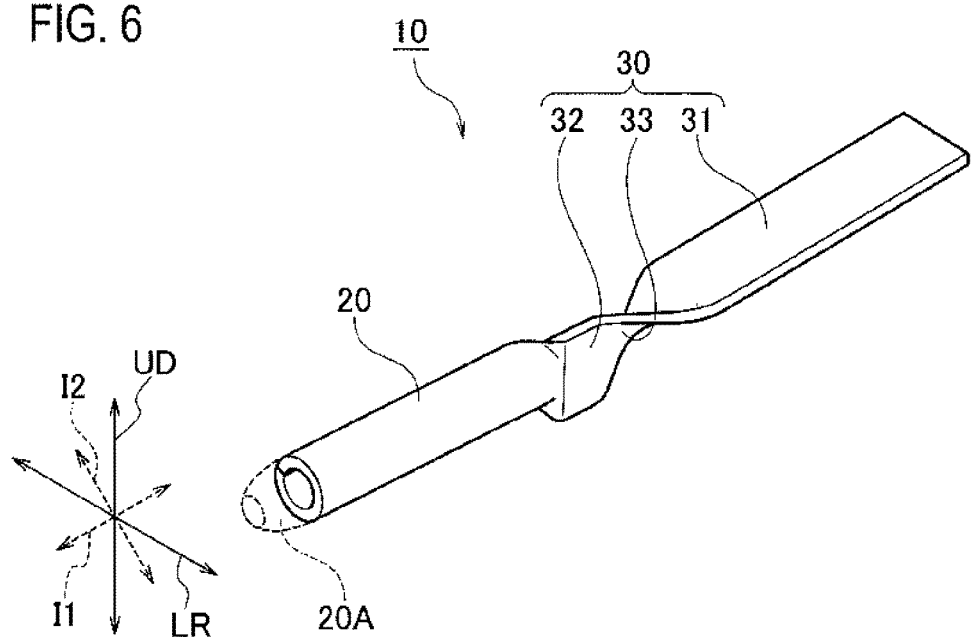
FIG. 6 is a perspective view that illustrates a terminal and a terminal displacement portion according to the first embodiment.

Next, a description will be given of the configuration of the terminal 10 described above with reference to FIGS. 4 to 6. FIG. 6 is a perspective view that illustrates the terminal 10 and a terminal displacement portion 30 according to the first embodiment.

As illustrated in FIGS. 4 and 6, the terminal 10 is connected to the mating terminal (not illustrated) by relative movement therebetween. As illustrated in FIG. 6, the terminal 10 is configured by a tubular mating terminal contact portion 20 which is arranged inside a terminal accommodating chamber 111 and in contact with the mating terminal (not illustrated), and the terminal displacement portion 30 provided to the inner housing 110B side than the mating terminal contact portion 20.

An insulative distal end portion 20A (made of resin) to prevent a finger of a user from contacting the mating terminal contact portion 20 is provided at a distal end of the mating terminal contact portion 20.

The terminal displacement portion 30 displaceably supports the terminal 10 in the cross direction CD (more particularly, a vertical direction UD, a lateral direction LR, and inclination directions I1 and I2 in FIG. 6) of the insertion direction ID of the charging connector. The terminal displacement portion 30 is formed integrally with the mating terminal contact portion 20.

As illustrated in FIG. 6, the terminal displacement portion 30 is formed by a plate-like first plate portion 31 positioned at the terminal support portion 115 side as a supporting point of the inner housing 110B, a second plate portion 32 positioned at the mating terminal contact portion 20 side of the terminal 10, and a twisted portion 33 twisted by about 90 degrees between the first plate portion 31 and the second plate portion 32.

The first plate portion 31 can be flexurally deformed in the vertical direction UD and displace the mating terminal contact portion 20 with respect to the vertical direction UD. The first plate portion 31 is fixed to the terminal support portion 115 and then connected to the electric wire pull-out terminal 220 of the rear connector 200. The first plate portion 31 and the electric wire pull-out terminal 220 are connected to each other by welding, for example, a resistance welding or the like.

The second plate portion 32 is orthogonal to the first plate portion 31 via the twisted portion 33. The second plate portion 32 can be flexurally deformed in the lateral direction LR and displace the mating terminal contact portion 20 with respect to the lateral direction LR.

These first plate portion 31 and the second plate portion 32 can displace the mating terminal contact portion 20 with respect to the inclination directions I1 and I2 by the respective flexural deformation described above.

Attachment of Charging Inlet Device

Figure 7:
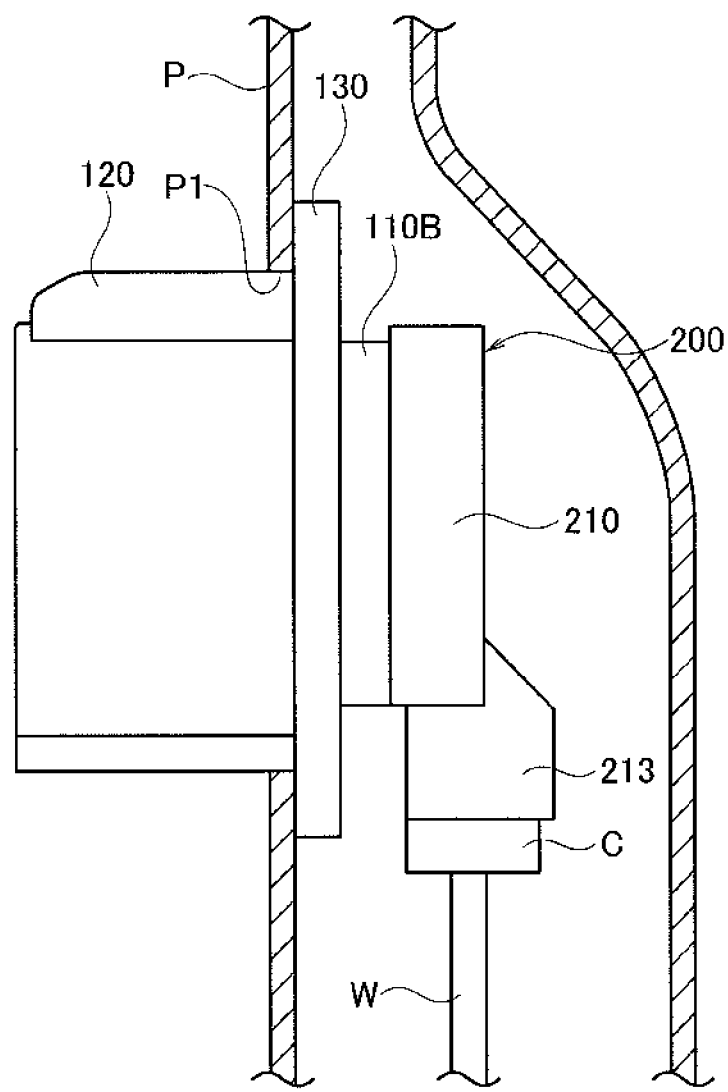
FIG. 7 is a diagram that illustrates an assembled state of the charging inlet device to a vehicle body panel according to the first embodiment.

Next, a brief description will be given to a attachment work of the above-described charging inlet device 1 to the vehicle body panel P with reference to FIGS. 4 and 7. FIG. 7 is a diagram that illustrates an assembled state of the charging inlet device 1 to the vehicle body panel P according to the first embodiment.

First, as illustrated in FIG. 4, the inner housing 110B to which the terminal 10 is fixed is mounted to the rear connector 200 via the packing 70 and an assembly 80. Thus, the rear connector 200 to which the terminal 10 and the inner housing 110B is mounted is assembled to the front housing 110A via the packing 90 so as to form the charging inlet device 1.

Next, as illustrated in FIG. 7, the charging inlet device 1 is inserted into an inlet mounting hole P1 of the vehicle body panel P from an inner side of the vehicle body panel P to cause the vehicle body mounting flange 130 to abut on the vehicle body panel P. Finally, the attachment work is completed when the vehicle body mounting flange 130 and the vehicle body panel P are fastened to each other by a bolt or the like.

Here, the connector C attached to the electric wire W routed to the vehicle side may be fitted into the connector insertion portion 213 of the rear connector 200 at the time of assembling the charging inlet device 1, and in addition, may be fitted into the connector insertion portion 213 of the rear connector 200 after the charging inlet device 1 is fastened to the vehicle body panel P by a bolt or the like.

Action and Effect

In the first embodiment described above, an axial core of the terminal 10 is displaced in accordance with the inclination of the mating terminal (that is, a so-called core alignment) since the terminal 10 may be displaced with respect to the vertical direction UD, the lateral direction LR, and the inclination directions I1 and I2 by the terminal displacement portion 30 even when the charging connector is inserted being inclined with respect to the front housing 110A. Therefore, the insertion force of the charging connector decreases so that it is possible to prevent a problem caused by the insertion force. In other words, load of the terminal 10 to the mating terminal contact portion 20 is reduced to improve the durability of the terminal 10. In addition, the mating terminal contact portion 20 of the terminal 10 is not deformed so that it is possible to suppress reduction in reliability of connection between the terminal 10 and the mating terminal (not illustrated).

In the first embodiment, the terminal displacement portion 30 is formed by the first plate portion 31, the second plate portion 32 and the twisted portion 33, and those portions are integrally formed with the mating terminal contact portion 20 of the terminal 10. Therefore, an additional member is not necessary to form the terminal displacement portion 30 so that it is possible to suppress increase in manufacturing cost of the charging inlet device 1.

In particular, since the first plate portion 31 and the second plate portion 32 are orthogonal to each other by the twisted portion 33, the terminal 10 may be easily displaced in various directions (the vertical direction UD, the lateral direction LR and the inclination directions I1 and I2 in FIG. 6) by the terminal displacement portion 30. Incidentally, with regard to a twisted angle of the twisted portion 33, it may not be necessarily about 90 degree, but may be arbitrarily set as long as the angle allows the terminal 10 to be displaced in various directions.

Second Embodiment

Figure 8:
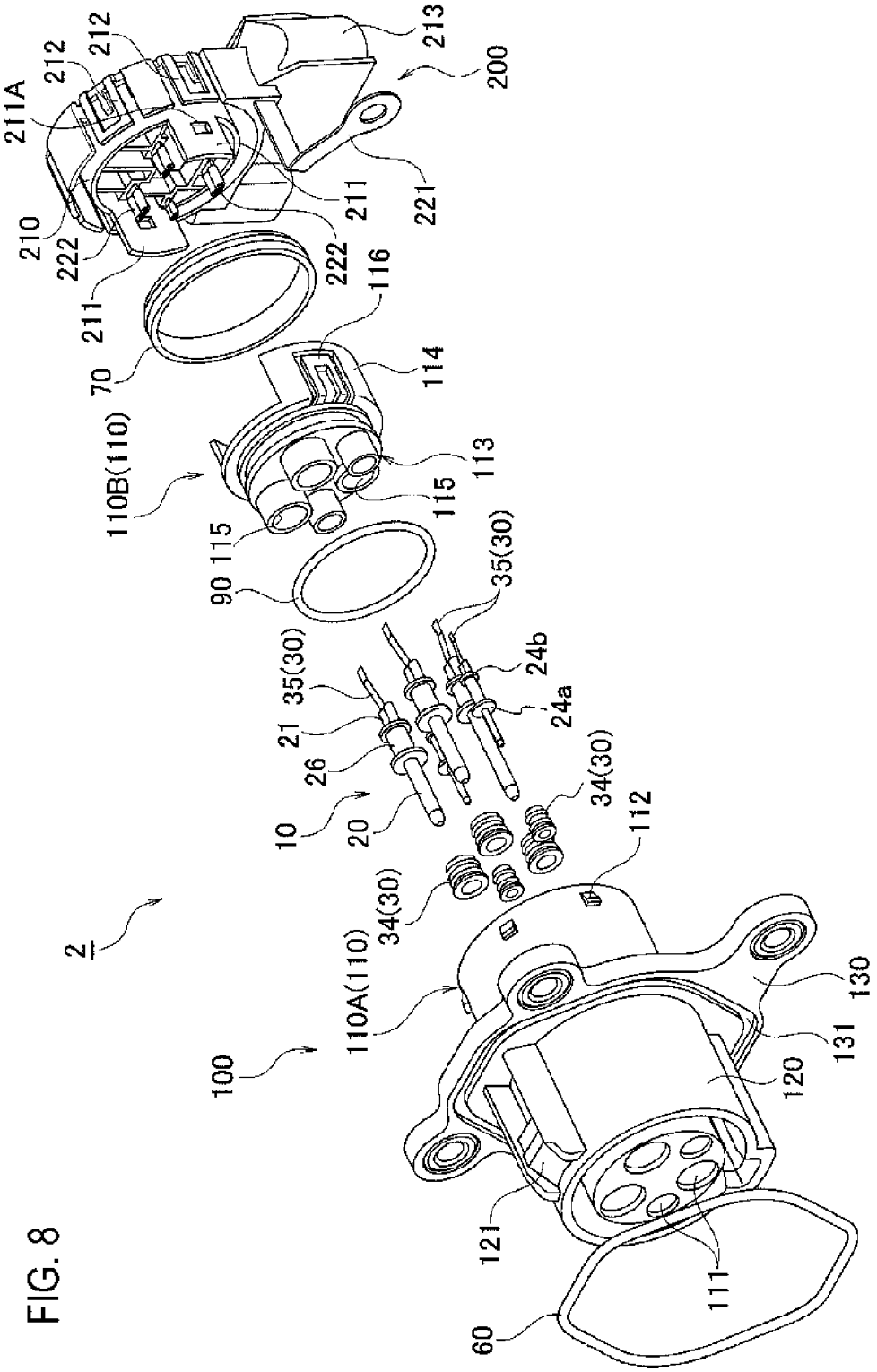
FIG. 8 is an exploded perspective view that illustrates a charging inlet device according to a second embodiment.
Figure 9A:
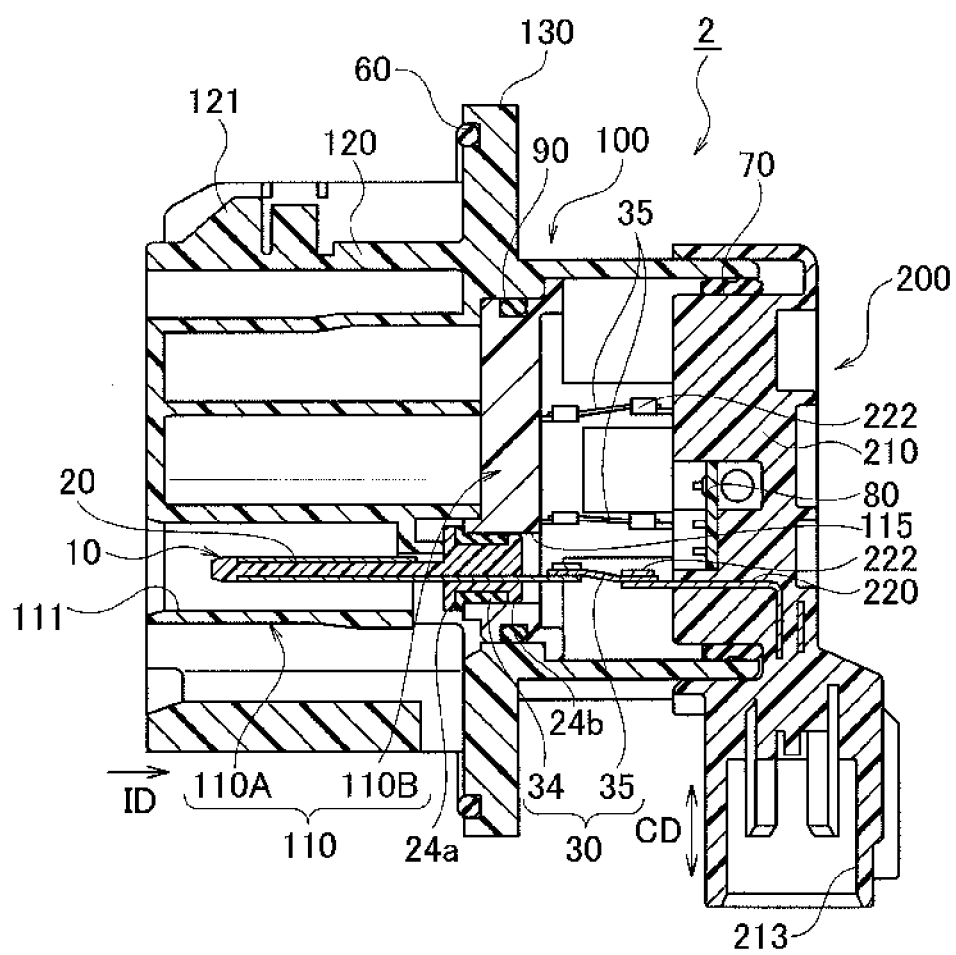
FIG. 9A is a vertical cross-sectional view (corresponding to the cross-sectional view taken along VA-VA of FIG. 3) of the charging inlet device according to the second embodiment.
Figure 9B:
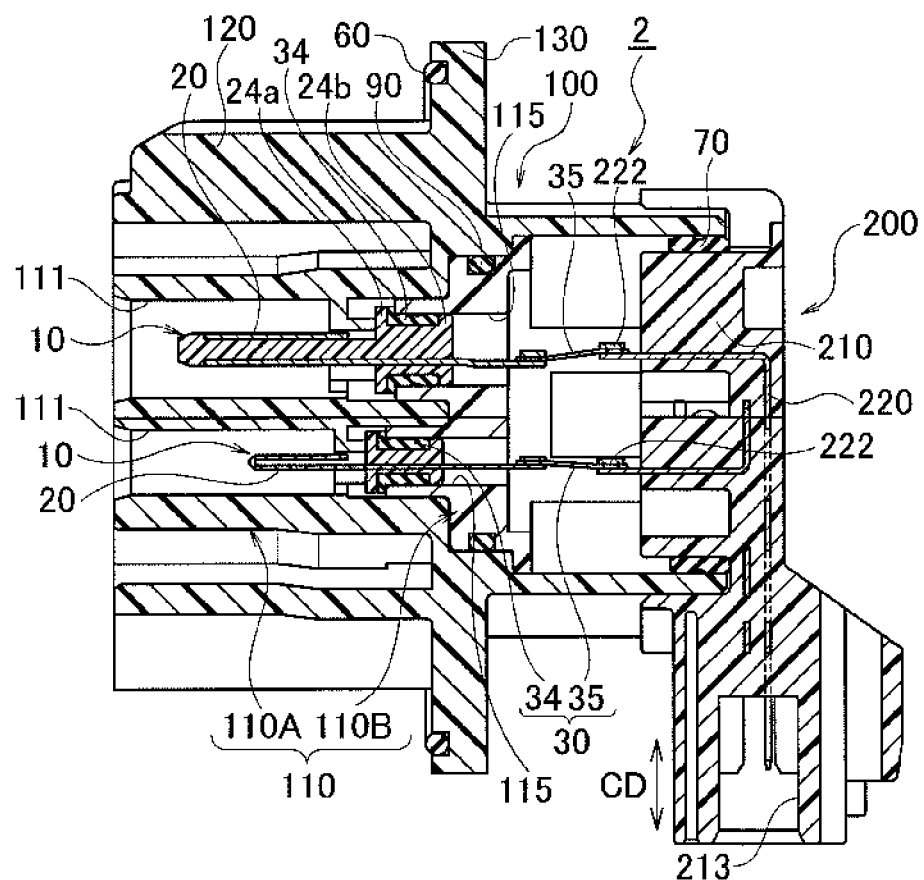
FIG. 9B is a vertical cross-sectional view (corresponding to the cross-sectional view taken along VB-VB of FIG. 3) of the charging inlet device according to the second embodiment.
Figure 10A:
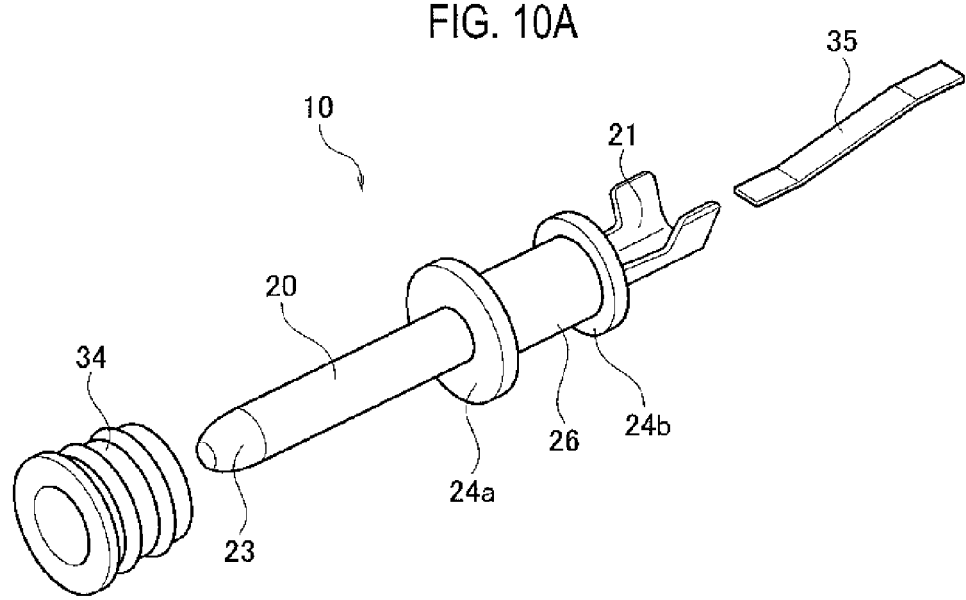
FIG. 10A is a perspective view that illustrates a terminal and a terminal displacement portion according to the second embodiment.
Figure 10B:
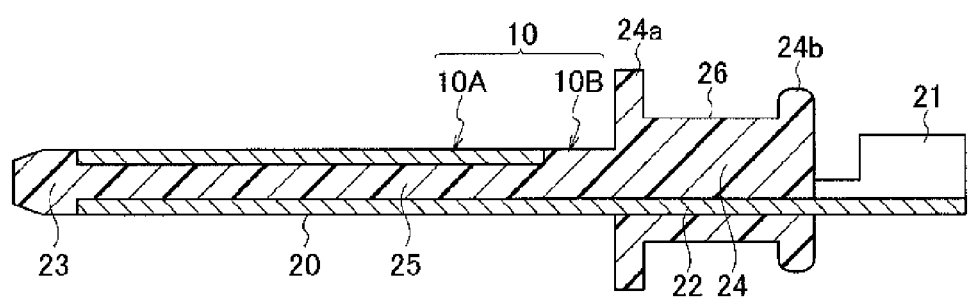
FIG. 10B is a perspective view that illustrates the terminal according to the second embodiment.

Next, a description will be given of a charging inlet device 2 according to a second embodiment with reference to the drawings. FIGS. 8, 9A and 9B are diagrams that illustrate the charging inlet device 2 according to the second embodiment. FIG. 10A is a perspective view that illustrates a terminal 10 and a terminal displacement portion 30 according to the second embodiment. FIG. 10B is a perspective view that illustrates the terminal 10 according to the second embodiment. Incidentally, the same parts with those in the above-described charging inlet device 1 according to the first embodiment are denoted by the same reference signs, and a description will be given only for the different parts.

In the first embodiment described above, the terminal displacement portion 30 is integrally formed with the terminal 10 (the mating terminal contact portion 20). On the contrary, in the second embodiment, the terminal displacement portion 30 is formed as a separate body from the terminal 10.

First, a description will be given of a configuration of the terminal 10. As illustrated in FIGS. 8 to 10B, the terminal 10 is configured by a conductive terminal body 10A and an insulating member 10B having an insulation property and fixed to the terminal body 10A.

The terminal body 10A is formed by bending a conductive plate having a predetermined shape by press processing. The terminal body 10A is provided with a tubular mating terminal contact portion 20 with which a mating terminal (not illustrated) is in contact, a terminal side crimping portion 21 to which a conductive member 35 of the terminal displacement portion 30 to be described later is fixed by crimping, and a connection portion 22 (see FIG. 10B) connecting those portions.

The insulating member 10B is configured by a distal end portion 23 projecting to the front from a distal end of the mating terminal contact portion 20, a terminal holding portion 24 arranged at an outer circumference of the connection portion 22 at a rear end side of the mating terminal contact portion 20, and a communication portion 25 which is provided in the mating terminal contact portion 20 and connects the distal end portion 23 and the terminal holding portion 24 to each other.

Ribs 24a and 24b are provided projecting along the entire circumference of the terminal holding portion 24 at both end of the outer circumference thereof. A fitting recess 26 formed by the pair of ribs 24a and 24b is provided in the outer circumference of the terminal holding portion 24.

Next, a description will be given of a configuration of the terminal displacement portion 30. As illustrated in FIGS. 8 to 10B, the terminal displacement portion 30 is formed by an elastic support member 34 having a cylindrical shape and supporting the terminal 10 against a terminal support portion 115 of an inner housing 110B, and the plate-like conductive member 35 to which an opposite side of the mating terminal contact portion 20 of the terminal 10 is connected.

The elastic support member 34 is formed using an elastic body such as rubber. The elastic support member 34 is mounted to the fitting recess 26 in a state of being positioned by the pair of ribs 24a and 24b.

The conductive member 35 has flexibility and connects the terminal 10 to an electric wire pull-out terminal 220 of a rear connector 200. One end of the conductive member 35 is fixed by crimping to the terminal side crimping portion 21 and connected to the terminal 10. Meanwhile, the other end of the conductive member 35 is fixed by crimping to rear side crimping portions 222 (see FIGS. 8, 9A and 9B) provided in an end portion of the electric wire pull-out terminal 220.

In such a charging inlet device 2 according to the second embodiment, the terminal 10 is fixed to the inner housing 110B by being fitted to a terminal support portion 115 (see FIGS. 8, 9A and 9B) formed in the inner housing 110B via the elastic support member 34.

Thus, as illustrated in FIGS. 9A and 9B, the rear-side rib 24b provided at the outer circumference of the terminal holding portion 24 and the elastic support member 34 are in close contact with an inner surface of the terminal support portion 115. In this manner, the terminal 10 may allow a direction of an axial core thereof to be displaced about the rib 24b as a fulcrum with respect to the inner housing 110B by the elastic deformation of the elastic support member 34. In addition, since the conductive member 35 has flexibility, it is possible to maintain the connection between the terminal 10 and the electric wire pull-out terminal 220 even when the terminal 10 is displaced.

In the second embodiment described above, the terminal displacement portion 30 is formed by the elastic support member 34 and the flexible conductive member 35 so that it is possible to freely support the displacement of the terminal 10 by the elastic support member 34 at the time of inserting the charging connector into the charging inlet device 2, and to connect the terminal 10 to the electric wire pull-out terminal 220 by the conductive member 35. In this manner, similarly to the first embodiment, the axial core of the terminal 10 is displaced in accordance with the inclination of the mating terminal (that is, a so-called core alignment) so that the insertion force of the charging connector decreases and it is possible to prevent a problem caused by the insertion force.

Third Embodiment

Figure 11:
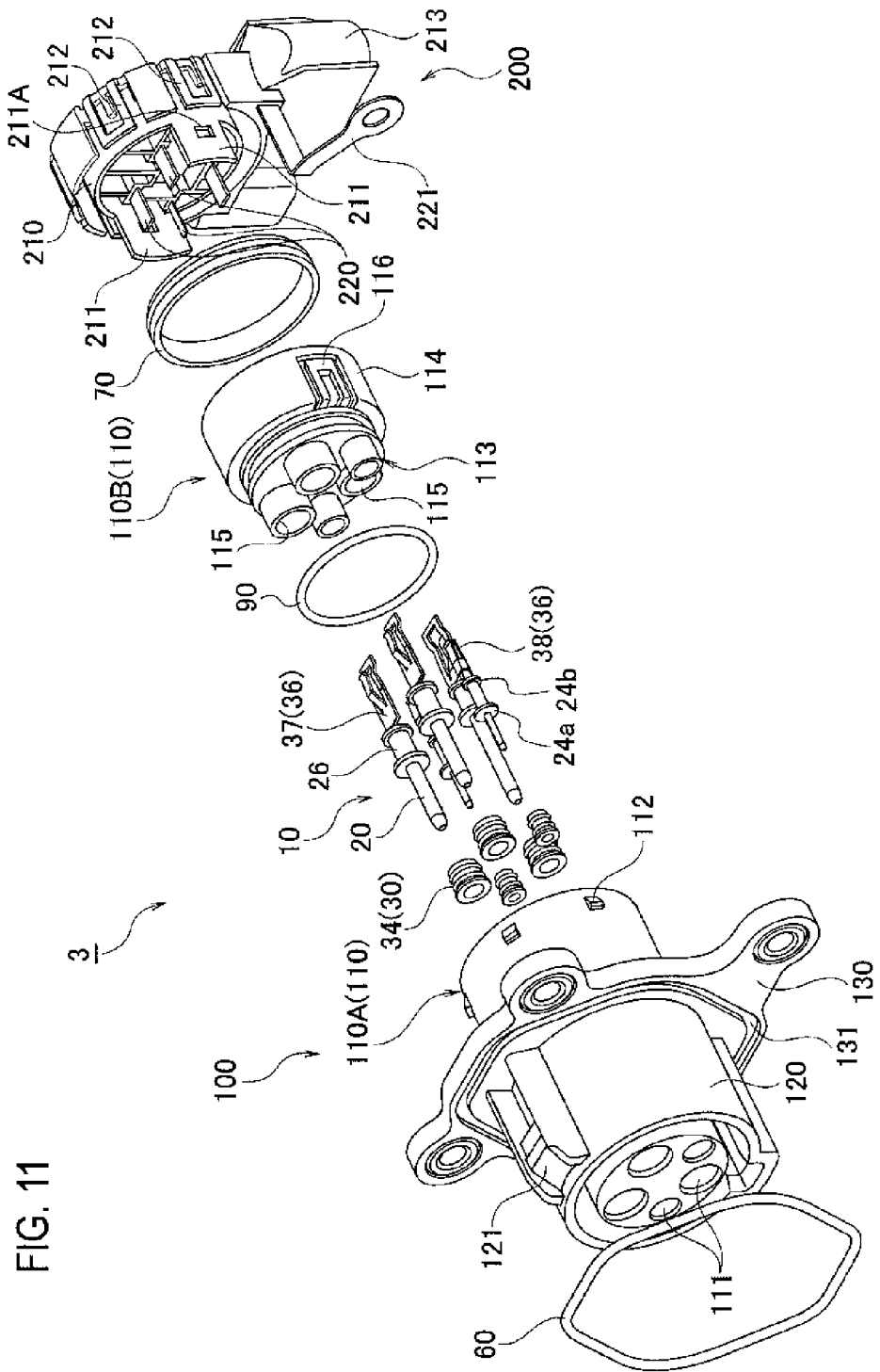
FIG. 11 is an exploded perspective view that illustrates a charging inlet device according to a third embodiment.
Figure 12A:
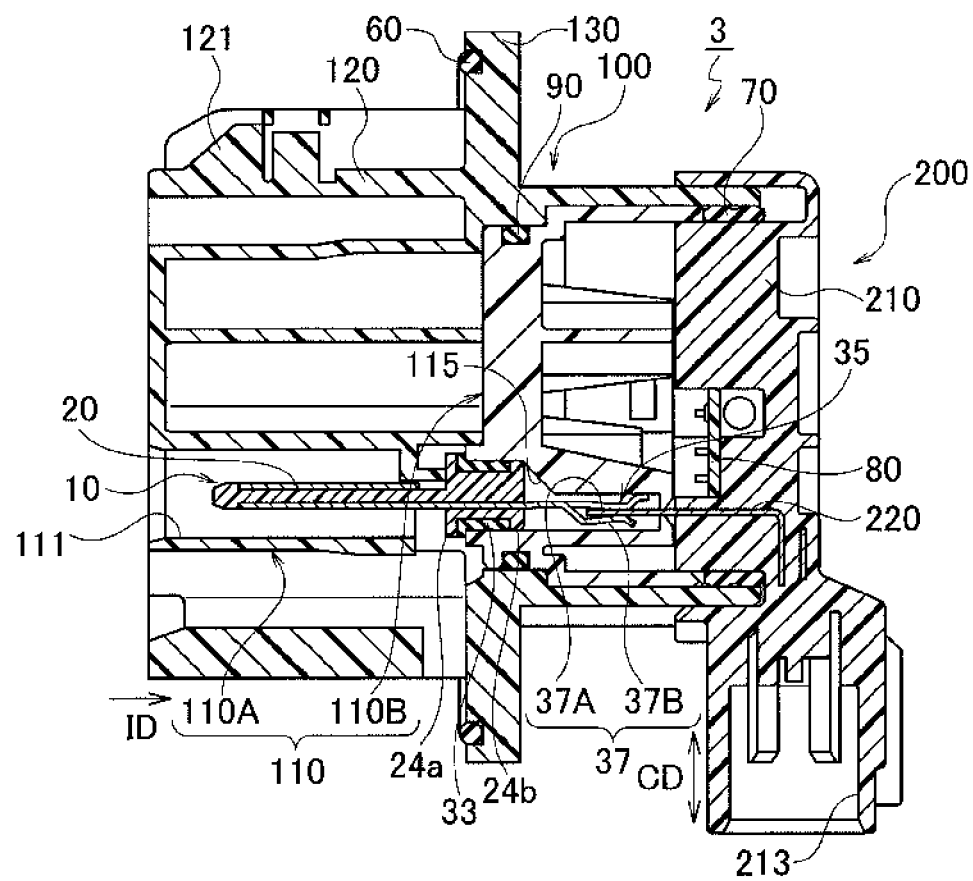
FIG. 12A is a vertical cross-sectional view (corresponding to the cross-sectional view taken along VA-VA of FIG. 3) of the charging inlet device according to the third embodiment.
Figure 12B:
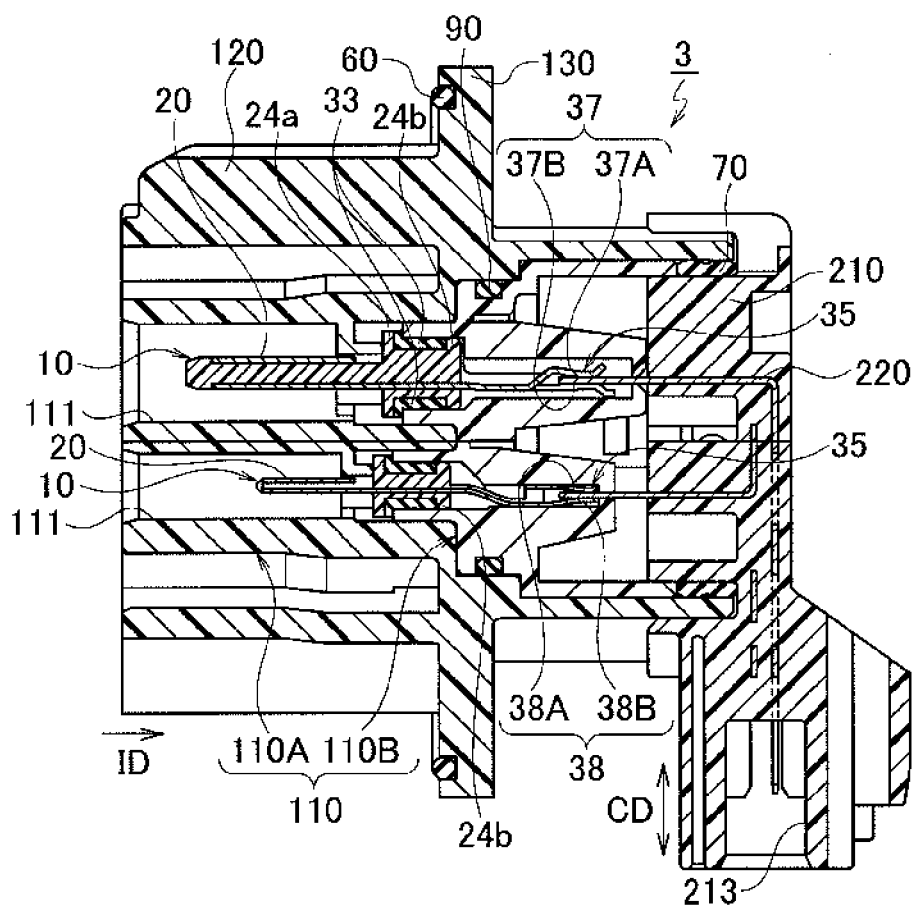
FIG. 12B is a vertical cross-sectional view (corresponding to the cross-sectional view taken along VB-VB of FIG. 3) of the charging inlet device according to the third embodiment.
Figure 13A:
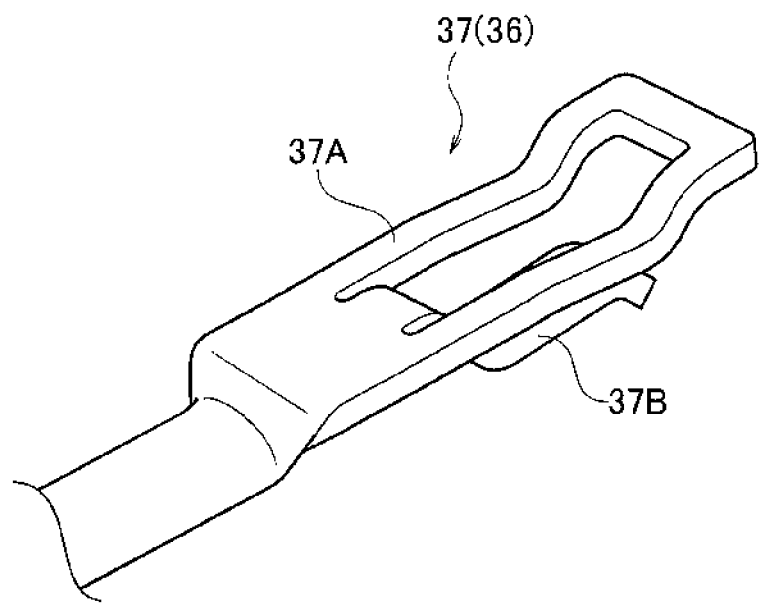
FIG. 13A is a perspective view that illustrates a terminal and a terminal displacement portion according to the third embodiment.
Figure 13B:
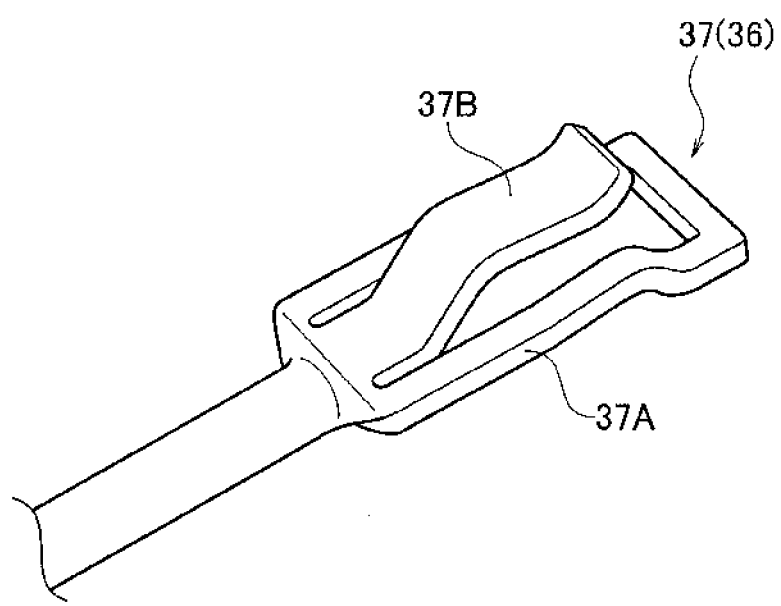
FIG. 13B is a perspective view that illustrates the terminal and the terminal displacement portion according to the third embodiment.
Figure 13C:
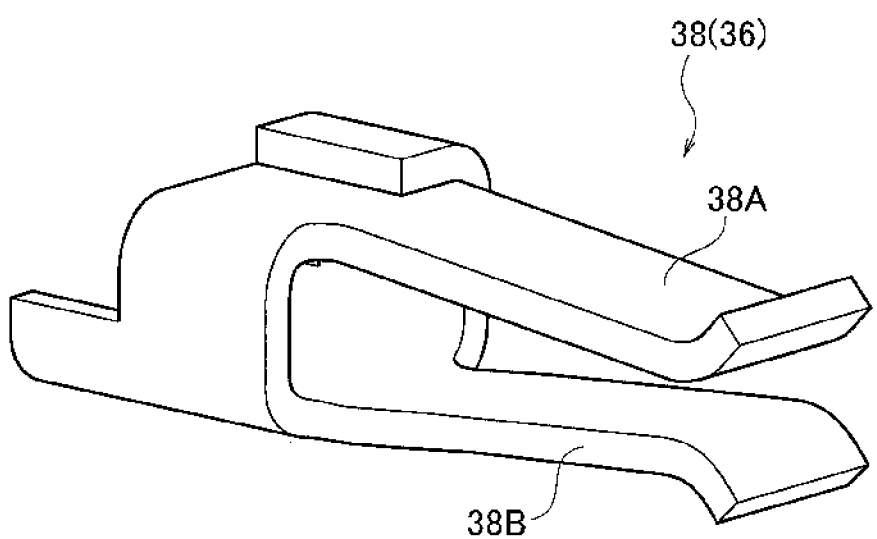
FIG. 13C is a perspective view that illustrates the terminal and the terminal displacement portion according to the third embodiment.

Next a description will be given of a charging inlet device 3 according to a third embodiment with reference to the drawings. FIGS. 11, 12A and 12B are diagrams that illustrate the charging inlet device 3 according to the third embodiment. FIGS. 13A to 13C are perspective views that illustrate a terminal 10 and a terminal displacement portion 30 according to the third embodiment. Incidentally, the same parts with those in the above-described charging inlet device 2 according to the second embodiment are denoted by the same reference signs, and a description will be given only for the different parts.

In the second embodiment described above, the terminal displacement portion 30 is formed as a separate body from the terminal 10. On the contrary, a part of the terminal displacement portion 30 is formed integrally with the terminal 10, and an elastic support member 34 of the terminal displacement portion 30 is formed as a separate body from the terminal 10 in the third embodiment.

More specifically, as illustrated in FIGS. 11 to 13C, the terminal displacement portion 30 is formed by the cylindrical elastic support member 34 supporting the terminal 10 between the elastic support member and a terminal support portion 115 of an inner housing 110B, and a leaf spring contact portion 36 arranged on the opposite side of the mating terminal contact portion 20 of the terminal 10.

The elastic support member 34 is mounted to a fitting recess 26 in a state of being positioned by a pair of ribs 24a and 24b provided at an outer circumference of a terminal holding portion 24, similarly to the second embodiment.

The leaf spring contact portion 36 is integrally formed with the mating terminal contact portion 20 of the terminal 10. The leaf spring contact portion 36 is configured by a high current leaf spring 37 provided to a thick terminal (for example, a charging terminal or a grounding terminal) among the terminals 10, and a low current leaf spring 38 provided to a thin terminal (for example, a signaling terminal) among the terminals 10.

As illustrated in FIGS. 12A, 12B, 13A and 13B, the high current leaf spring 37 is configured by a plate-like plate body portion 37A, and a plate cut-and-raised portion 37B which is cut and raised from the plate body portion 37A. An end of an electric wire pull-out terminal 220 is sandwiched by the plate body portion 37A and the plate cut-and-raised portion 37B.

As illustrated in FIGS. 12B and 13C, the low current leaf spring 38 is configured by a pair of nipping pieces 38A and 38B facing each other. An end of the electric wire pull-out terminal 220 is sandwiched by the pair of nipping pieces 38A and 38B.

In such a charging inlet device 3 according to the third embodiment, the terminal 10 is fixed to the inner housing 110B by being fitted into the terminal support portion 115 (see FIGS. 11, 12A and 12B) formed in the inner housing 110B via the elastic support member 34.

Thus, as illustrated in FIGS. 12A and 12B, the rib 24b at the rear side which is provided on the outer circumference of the terminal holding portion 24 and the elastic support member 34 are in close contact with an inner surface of the terminal support portion 115. In this manner, the terminal 10 may allow a direction of an axial core thereof to be displaced about the rib 24b as a fulcrum with respect to the inner housing 110B by the elastic deformation of the elastic support member 34. In addition, since one end of the electric wire pull-out terminal 220 is nipped by the leaf spring contact portion 36, the connection between the terminal 10 and the electric wire pull-out terminal 220 can be maintained even when the terminal 10 is displaced.

In the third embodiment described above, the terminal displacement portion 30 is formed by the elastic support member and the leaf spring contact portion 36 so that the displacement of the terminal 10 may be freely supported by the elastic support member 34 when the charging connector is inserted into the charging inlet device 3, and the connection between the terminal 10 (the mating terminal contact portion 20) and the electric wire pull-out terminal 220 may be maintained by the leaf spring contact portion 36. Therefore, similarly to the first and second embodiments, the axial core of the terminal 10 is displaced in accordance with the inclination of the mating terminal (that is, a so-called core alignment) so that the insertion force of the charging connector decreases and it is possible to prevent a problem caused by the insertion force.

Other Embodiments

As described above, the disclosure has been made for the content of the present invention on the basis of the embodiment of the present invention; however, it should not be understood that the description and the drawings, which forma part of this disclosure, limit the present invention. From this disclosure, varieties of alternative embodiments, examples and operation technologies will be obvious for a person skilled in the art.

For example, the embodiment of the present invention may be altered as follows. More specifically, the description has been made in the first to third embodiments for the case in which the terminal displacement portion 30 is provided to the inlet connector 100 of the charging inlet device 1. However, without being limited thereto, the terminal displacement portion 30 may be provided to a vicinity of the electric wire pull-out terminal 220 of the rear connector 200. In addition, the terminal displacement portion 30 may be provided to the charging connector, and of course, may be applicable to connectors of various other types.

In addition, the description has been made in the first to third embodiments for the case in which the pull-out direction of the electric wire W is the downward direction of the rear connector 200. However, without being limited thereto, the pull-out direction of the electric wire W may be an upward direction or a lateral direction of the rear connector 200.

In this way, the present invention includes various embodiments not described above. Therefore, the scope of the present invention is determined only by the invention identification matters according to claims reasonable from the foregoing description.

What is claimed is:

1. A connector comprising:
   a terminal to be connected to a mating terminal by a relative movement between the terminal and the mating terminal;
   a connector housing supporting the terminal; and
   a terminal displacement portion displaceably supporting the terminal in a direction orthogonal to a direction of the relative movement between the terminal and the mating terminal,
   wherein the terminal comprises:
   a mating terminal contact portion for contacting the mating terminal: and a terminal holding portion having an insulating rib projecting radially outwardly therefrom;
   wherein the terminal displacement portion comprises: an elastic support member supporting the terminal against the connector housing; and
   a leaf spring contact portion provided at an opposite side of the mating terminal contact portion on the terminal; and
   wherein the leaf spring contact portion is configured to contact an electric pull-out terminal of the connector housing as a result of the terminal being connected to the mating terminal.

2. The connector according to claim 1, wherein the terminal holding portion is located in between the mating terminal contact portion and the leaf spring contact portion.

3. The connector according to claim 1, wherein the rib is configured to contact an inner surface of the connector housing as a result of the terminal being connected to the mating terminal.

4. The connector according to claim 1, wherein
   the terminal displacement portion is configured to support the terminal in a direction orthogonal to a direction of the relative movement between the terminal and the mating terminal,
   the terminal comprises a thick terminal and a thin terminal,
   the leaf spring contact portion comprises a high current leaf spring provided to the thick terminal and a low current leaf spring provided to the thin terminal,
   the high current leaf spring comprises a plate-like plate body portion and a plate cut-and-raised portion which is cut and raised from the plate body portion.

5. The connector according to claim 1, further comprising: an electric wire pull-out terminal,
   wherein an end of the electric wire pull-out terminal is sandwiched by the plate body portion and the plate cut-and-raised portion.

* * * * *